United States Patent
Tsai et al.

(10) Patent No.: US 9,147,165 B2
(45) Date of Patent: Sep. 29, 2015

(54) METHOD OF LOCATION ESTIMATION AND TRACKING USING DISTRIBUTED MESSAGE PASSING OF HETEROGENEOUS OBSERVATION DATA ACCOMPANIED WITH LOW-COMPLEXITY DATA-FUSION SCHEME

(75) Inventors: Fuan Tsai, Changhua (TW); Yih-Shyh Chiou, Taoyuan County (TW)

(73) Assignee: NATIONAL CENTRAL UNIVERSITY, Jhongli, Taoyuan County (TW)

( * ) Notice: Subject to any disclaimer, the term of this patent is extended or adjusted under 35 U.S.C. 154(b) by 368 days.

(21) Appl. No.: 13/339,602

(22) Filed: Dec. 29, 2011

(65) Prior Publication Data

US 2013/0110762 A1    May 2, 2013

(30) Foreign Application Priority Data

Oct. 31, 2011    (TW) .............................. 100139650 A

(51) Int. Cl.
     *G06N 99/00*      (2010.01)
(52) U.S. Cl.
     CPC ................................. *G06N 99/005* (2013.01)
(58) Field of Classification Search
     CPC .................................................. G06N 99/005
     See application file for complete search history.

(56) References Cited

U.S. PATENT DOCUMENTS

| | | | | |
|---|---|---|---|---|
| 6,081,230 | A * | 6/2000 | Hoshino et al. ......... | 342/357.32 |
| 6,408,245 | B1 * | 6/2002 | An et al. ................... | 701/472 |
| 2003/0018430 | A1 * | 1/2003 | Ladetto et al. ........... | 701/217 |
| 2003/0048218 | A1 * | 3/2003 | Milnes et al. ............ | 342/357.07 |
| 2007/0156338 | A1 * | 7/2007 | Coatantiec et al. ....... | 701/214 |
| 2009/0030667 | A1 * | 1/2009 | Toloo et al. .............. | 703/17 |
| 2010/0289699 | A1 * | 11/2010 | Wu et al. ................. | 342/450 |

OTHER PUBLICATIONS

Factor Graphs and the Sum-Product Algorithm, by Kschischang, published 2001.*
Discrete-Time Adaptive Windowing for Velocity Estimation, by Janabi-Sharifi et al., published 2000.*
Location Tracking of Mobiles in Cellular Radio Networks, by Hellebrandt et al., published 1999.*
GPS/IMU data fusion using multisensor Kalman filtering: introduction of contextual aspects, by Caron et al., published 2006.*
3D Relative Position and Using Kalman Filter Orientation Estimation for Robot Control, by Wang et al., published 1992.*
WLAN-Based Pedestrian Tracking Using Particle Filters and Low-Cost MEMS Sensors, by Wang et. al, published 2007.*

* cited by examiner

*Primary Examiner* — Jeffrey A Gaffin
*Assistant Examiner* — Thomas Fink
(74) *Attorney, Agent, or Firm* — Jackson IPG PLLC; Demian K. Jackson

(57) ABSTRACT

The present invention provides a method of location estimation and tracking. An absolute positioning scheme and a relative positioning scheme are combined. The present invention is accompanied with low-complexity multiple heterogeneous data fusion. A multiple observation data algorithm is thus formed. The present invention improves accuracy of positioning result obtained through location estimation and tracking.

5 Claims, 10 Drawing Sheets

| Algorithms | Calculation number of multiplications and divisions | Calculation number of additions and subtractions | Inverse operation | Transpose operations |
|---|---|---|---|---|
| KF method (X,Y) | $S(3S^2+3SP+2P^2) \Rightarrow 512$ | $3S^2+S2(3P-2)+S(2P^2-3P)+P \Rightarrow 436$ | $[\ ]_{P \times P} \Rightarrow [\ ]_{4 \times 4}$ | $[\ ]_{S \times S}, [\ ]_{P \times P}$ $\Rightarrow [\ ]_{4 \times 4}, [\ ]_{4 \times 4}$ |
| FBR method (X,Y) | $18 \times 2 = 36$ | $13 \times 2 = 26$ | / | / |

S: States of the System (S=4)   P: Inputs of the System (P=4)

FIG.10

METHOD OF LOCATION ESTIMATION AND TRACKING USING DISTRIBUTED MESSAGE PASSING OF HETEROGENEOUS OBSERVATION DATA ACCOMPANIED WITH LOW-COMPLEXITY DATA-FUSION SCHEME

TECHNICAL FIELD OF THE INVENTION

The present invention relates to location estimation and tracking; more particularly, relates to a data-fusion algorithm using distributed message passing accompanied with a low-complexity scheme.

DESCRIPTION OF THE RELATED ARTS

With the rapid advance in wireless communication and mobile network technologies and with the modular and miniaturized electro-mechanical systems in inertial measurement units (IMUs), robust and accurate location estimation systems have been getting great momentum in every aspect. Among various applications, location-based services (LBSs) have been set up and commonly used in outdoor and indoor environments. Methods of location estimation and tracking include absolute positioning scheme and relative positioning scheme, where radio ranging scheme (absolute scheme) is based on wireless network services; and speed sensing scheme (relative scheme) is based on an IMU, a package of inertial sensors (gyroscopes and accelerometers). However, location accuracy and computational complexity are key indexes for location estimation and tracking systems.

Regarding accuracy of location estimation systems, an accurate location can be improved in estimation with location tracking algorithms. The location estimation and tracking algorithm plays a role to perform recursive state estimation, which uses a state equation and an observation equation. Prediction and correction are fundamental phases of a location tracking system. Because Kalman filtering (KF) algorithm is a recursive approach based on a mean-square error (MSE) algorithm, it has been introduced to enhance the accurate estimation of the location estimation system. For location estimation techniques, data fusion based on KF algorithm is considered optimal for a linear Gaussian model during location estimation and tracking. However, an accurate location estimation system applied to data-fusion algorithm according to KF techniques requires high computational complexity; and, direct implementation of the KF algorithm may be too complex for practical systems. Hence, low-complexity techniques are preferred and worth developing.

Some fixed coefficient or degenerate form algorithms (for example, α-β algorithm) are proposed to avoid calculating the Kalman gain repeatedly; and computational complexities of these schemes are much lower than that of the traditional KF algorithm. Other location estimation algorithms with more computationally attractive schemes based on the inherent nature of factor graphs (FGs) are proposed to reduce the complexities of conventional schemes. These techniques pass reliable messages between variable nodes (VNs) and factor nodes (FNs). For the former schemes, the coefficients of these algorithms have to be extracted again when these algorithms change their coefficients for different situations. The former and latter schemes are based on radio ranging algorithm to infer the location of a moving terminal (MT). Yet, these methods do not consider a low-complexity data-fusion algorithm using heterogeneous observations for location estimation and tracking.

Consequently, low-complexity techniques are worth developing in order to reduce computation of conventional tracking algorithms, to obtain more flexible tracking schemes, and to develop data-fusion algorithms based on both absolute positioning scheme and relative positioning scheme with heterogeneous data for location estimation and tracking.

Hence, the prior arts do not fulfill all users' requests on actual use.

SUMMARY OF THE INVENTION

The main purpose of the present invention is to provide a method of location estimation and tracking through combining an absolute positioning scheme and a relative positioning scheme accompanied with a low-complexity data fusion.

The second purpose of the present invention is to effectively reduce computational complexities of traditional tracking schemes through a flow of distributed message passing for location estimation and tracking.

The third purpose of the present invention is to fuse the absolute positioning scheme and the relative positioning scheme to form a multiple observation data algorithm for improving accuracy of positioning result obtained through location estimation and tracking.

To achieve the above purposes, the present invention is a method of location estimation and tracking using distributed message passing of heterogeneous observation data accompanied with a low-complexity data-fusion scheme, comprising steps of: (a) based on values of location and speed of an MT at a current time (time k), predicting possible values of location and speed of the MT at a next sampling time (time k+1) under a known moving-state distribution to process time update; (b) based on a distribution of observation values of a currently received radio signal, extracting a distribution of observation values of location of the MT at the current time (time k) through an absolute positioning scheme; (c) based on a distribution of observation values of acceleration of the MT and error propagation law, extracting a value of speed of the MT through a relative positioning scheme; (d) when the MT moves to a location at the next sampling time (time k+1), combining the observation values of location obtained in step (b) with the value of speed obtained in step (c) as the actual location and speed observations to process measurement update at the current time (time k+1) for adjusting the predicted estimate results; and (e) based on the time update in step (a) and the measurement update in step (d), obtaining a distribution of predicted values of location and speed of the MT at the next sampling time (time k+1) and a distribution of observation values of location and speed of the MT at the next sampling time (time k+1), respectively; and then, based on the distribution of predicted values of location and speed and based on the distribution of observation values of location and speed, giving different fusion weights to extract values of location and speed by using a heterogeneous data fusion algorithm according to the reliability information of location and speed to correct the estimated values of location and speed of the MT at the next sampling time (time k+1). Accordingly, a novel method of location estimation and tracking using distributed message passing of heterogeneous observation data accompanied with a low-complexity data-fusion scheme is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the view showing the processes of location estimation and tracking according to the preferred embodiment of the present invention;

FIG. 10 is the view showing the comparison of the 2D computational complexities between the KF-based data-fusion scheme and the FBR-based data-fusion scheme.

DESCRIPTION OF THE PREFERRED EMBODIMENT

Figure 1:
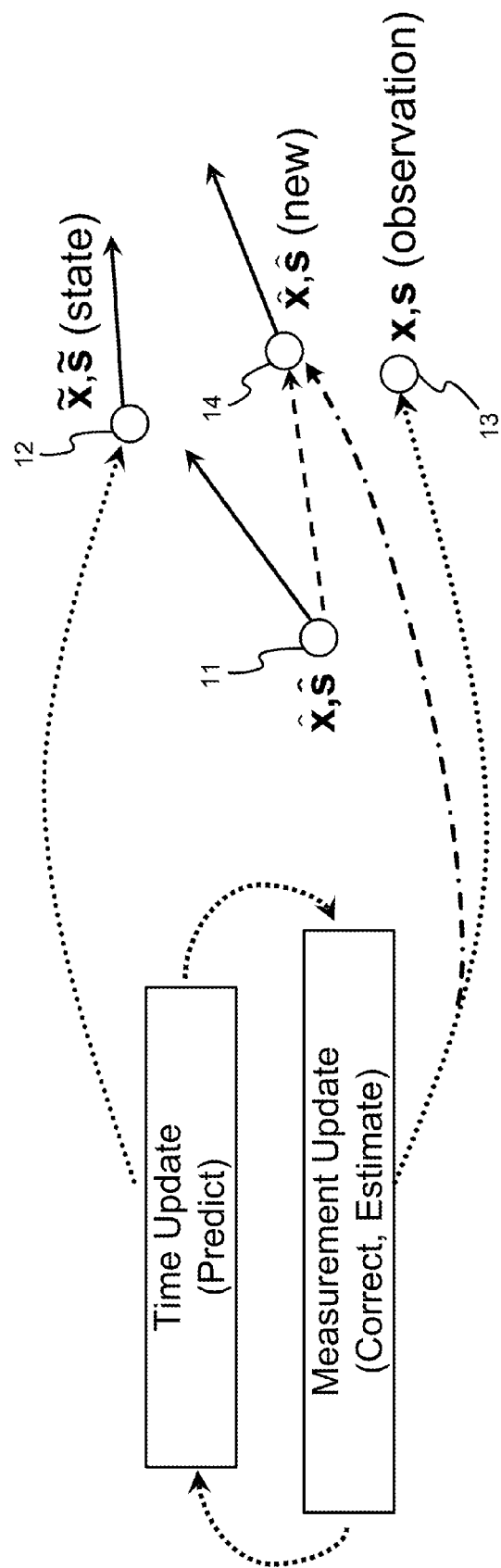

The following description of the preferred embodiment is provided to understand the features and the structures of the present invention.

Please refer to FIG. 1 to FIG. 7, which are a view showing processes of location estimation and tracking according to the preferred embodiment of the present invention; a block view showing a flow of the message passing; a view showing a flow at an X axis in an FBR algorithm with fusion of passed messages; a view showing error propagation law of a system having multiple inputs and multiple outputs; a view showing relationships between variable nodes (VNs) and factor nodes (FNs) at the X axis in an factor graph (FG) scheme; a flow view showing a heterogeneous data fusion algorithm; and a view showing message passing processes from a VN to an FN with three incoming messages. As shown in the figures, the present invention is a method of location estimation and tracking using distributed message passing of heterogeneous observation data accompanied with a low-complexity data-fusion scheme, where Gaussian-distributed observation values of location and speed are obtained through an absolute positioning scheme and a relative positioning scheme by combining predicted values in a moving state and observation values in a current state. Moreover, the present invention is used in an environment of a coordinate system having more than two dimensions (2D). The present invention comprises the following steps:

(a) Obtaining moving-state distribution 21: Based on values of location and speed of a moving terminal (MT) 11 (or a mobile device) at a current time (time k), possible values of location and speed of the MT at a next sampling time (time k+1) are predicted under a known moving-state distribution to process time update. Therein, taking a 2D coordinate system as an example, a calculation formula (1) as follows for a predicted moving-state distribution is used:

$$\begin{bmatrix} \tilde{x} \\ \tilde{s} \end{bmatrix} = \begin{bmatrix} x_{1,k+1} \\ x_{2,k+1} \\ \dot{x}_{1,k+1} \\ \dot{x}_{2,k+1} \end{bmatrix} = \begin{bmatrix} x_{1,k+1} \\ x_{2,k+1} \\ s_{1,k+1} \\ s_{2,k+1} \end{bmatrix} = \begin{bmatrix} 1 & 0 & \Delta_k & 0 \\ 0 & 1 & 0 & \Delta_k \\ 0 & 0 & 1 & 0 \\ 0 & 0 & 0 & 1 \end{bmatrix} \begin{bmatrix} x_{1,k} \\ x_{2,k} \\ \dot{x}_{1,k} \\ \dot{x}_{2,k} \end{bmatrix} + \begin{bmatrix} u_{1,k} \\ u_{2,k} \\ u_{3,k} \\ u_{4,k} \end{bmatrix}, \quad (1)$$

where $(x_{1,k}, x_{2,k})$ and $(\dot{x}_{1,k}, \dot{x}_{2,k}) = (s_{1,k}, s_{2,k})$ are the values of location and speed of the MT at a current time (time k), respectively; $(x_{1,k+1}, x_{2,k+1})$ and $(s_{1,k+1}, s_{2,k+1})$ are predicted values of location and speed of the MT at a next sampling time (time k+1) obtained by using the calculation formula (1), respectively; (are predicted $u_{1,k}, u_{2,k}$) and $(u_{3,k}, u_{4,k})$ random errors of location and speed of the MT at the current time (time k), respectively; and $\Delta_k$ is a time-difference between the current time (time k) and the next sampling time (time k+1) or a sampling time.

(b) Obtaining observation value of location 22: Based on a distribution of observation values of a currently received radio signal, a distribution of observation values of location of the MT at the current time (time k) is extracted with an absolute positioning scheme. Then, a distribution of the observation values of location is obtained through a calculation formula (2) as follows:

$$\begin{bmatrix} z_{1,k} \\ z_{2,k} \end{bmatrix} = \begin{bmatrix} 1 & 0 & 0 & 0 \\ 0 & 1 & 0 & 0 \end{bmatrix} \begin{bmatrix} x_{1,k} \\ x_{2,k} \\ \dot{x}_{1,k} \\ \dot{x}_{2,k} \end{bmatrix} + \begin{bmatrix} \varepsilon_{1,k} \\ \varepsilon_{2,k} \end{bmatrix}, \quad (2)$$

where $(z_{1,k}, z_{2,k})$ is an observation value of location of the MT; $(\varepsilon_{1,k}, \varepsilon_{2,k})$ is a random error of the observation value of location.

(c) Obtaining value of speed 23: Based on a distribution of observation values of acceleration of the MT and an error propagation law, a value of speed of the MT is extracted through a relative positioning scheme. Then, a distribution of observation values of speed is obtained through a calculation formula (3). A distribution of speed of the MT is extracted from the acceleration of the MT through a calculation formula (4) using the error propagation law. The calculation formula (3) and the calculation formula (4) are as follows:

$$\begin{bmatrix} z_{3,k} \\ z_{4,k} \end{bmatrix} = \begin{bmatrix} 0 & 0 & 1 & 0 \\ 0 & 0 & 0 & 1 \end{bmatrix} \begin{bmatrix} x_{1,k} \\ x_{2,k} \\ \dot{x}_{1,k} \\ \dot{x}_{2,k} \end{bmatrix} + \begin{bmatrix} \varepsilon_{3,k} \\ \varepsilon_{4,k} \end{bmatrix} \text{ and} \quad (3)$$

$$v = f(a) = a \cdot \Delta t + v_0, \quad (4)$$

where $(z_{3,k}, z_{4,k}) = (v_{1,k}, v_{2,k})$ is an observation value of speed of the MT; $(\varepsilon_{3,k}, \varepsilon_{4,k})$ is a random error for the observation value of the speed; a is an observation value (a measured value) of acceleration; v is a value of speed extracted from the acceleration; $v_0$ is an initial speed; and $\Delta t$ is a transformation relationship between the acceleration and the speed.

(d) Processing fusion of observation data 24: When the MT 11 moves to a position at the next sampling time (time k+1), the calculation formula (2) in step (b) for the observation values of location and the calculation formula (3) in step (c) for the observation value of speed are combined into a calculation formula (5) as follows for obtaining a current state of location and speed of the MT 13 to process measurement update for the next sampling time (time k+1):

$$z = \begin{bmatrix} x \\ s \end{bmatrix} \quad (5)$$

$$= \begin{bmatrix} z_{1,k+1} \\ z_{2,k+1} \\ v_{1,k+1} \\ v_{2,k+1} \end{bmatrix}$$

$$= \begin{bmatrix} z_{1,k+1} \\ z_{2,k+1} \\ z_{3,k+1} \\ z_{4,k+1} \end{bmatrix}$$

$$= \begin{bmatrix} 1 & 0 & 0 & 0 \\ 0 & 1 & 0 & 0 \\ 0 & 0 & 1 & 0 \\ 0 & 0 & 0 & 1 \end{bmatrix} \begin{bmatrix} x_{1,k+1} \\ x_{2,k+1} \\ \dot{x}_{1,k+1} \\ \dot{x}_{2,k+1} \end{bmatrix} + \begin{bmatrix} \varepsilon_{1,k+1} \\ \varepsilon_{2,k+1} \\ \varepsilon_{3,k+1} \\ \varepsilon_{4,k+1} \end{bmatrix}.$$

Therein, $(z_{1,k+1}, z_{2,k+1})^T$ is an observation value of location of the MT at the current state (time k+1); $(z_{3,k+1}, z_{4,k+1})^T = (v_{1,k+1}, v_{2,k+1})^T$ is an observation value of speed of the MT at the current state (time k+1); $(x_{1,k+1}, x_{2,k+1})$ and $(\dot{x}_{1,k+1}, \dot{x}_{2,k+1})$ are the values of location and speed of the MT at the current state (time k+1), respectively; and $(\varepsilon_{1,k+1}, \varepsilon_{2,k+1})$ and $(\varepsilon_{3,k+1}, \varepsilon_{4,k+1})$ are random errors of the observation values of location and speed of the MT at the current state (time k+1), respectively.

Figure 3:
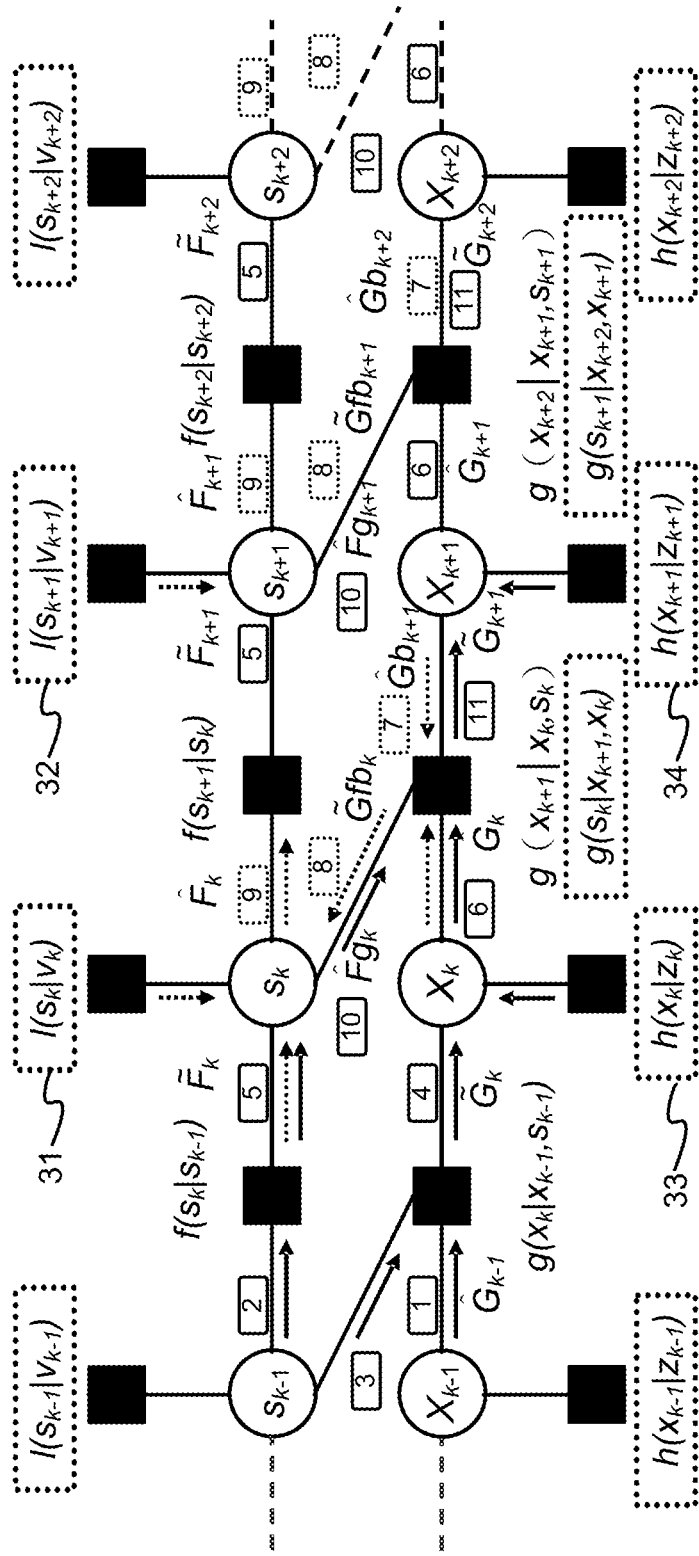
FIG. 3 is the view showing the flow at the X axis in the forward-backward refining (FBR) algorithm with the fusion of passed messages.

(e) Processing heterogeneous data fusion 25: For extracting and fusing estimated information of location and speed with reliability information passed efficiently between the prediction phase (time update) and correction phase (measurement update), actual measurement information of location and speed are used to adjust predicted information of location and speed. That is, a distribution of estimated values of location and speed of the MT 12 at the next sampling time (time k+1) is obtained according to the time update with the calculation formula (1) in step (a); and a distribution of observation values of location and speed of the MT 13 at the current state (time k+1) is obtained according to the measurement update with the calculation formula (5) in step (d). At last, based on the distributions obtained through the calculation formula (1) and the calculation formula (5), different weights are passed to fuse values of location and speed according to reliability information of location and speed accompanied with a heterogeneous data fusion algorithm for modifying the estimated values of location $\hat{x}$ and speed $\hat{s}$ of the MT 14 at the next sampling time (time k+1). In FIG. 3, $I(s_k/v_k)$ 31 and $I(s_{k+1}/v_{k+1})$ 32 are values of speed obtained through a relative positioning scheme at the current time (time k) and the next sampling time (time k+1), respectively; and $h(x_k/z_k)$ 33 and $h(x_{k+1}/z_{k+1})$ 34 are values of location obtained at the current time (time k) and the next sampling time (time k+1) through an absolute positioning scheme, respectively.

In step (b), the radio signals are wireless network signals of a global positioning system (GPS), a wireless wide area network (WWAN), a wireless local area network (WLAN) or a wireless personal area network (WPAN), where the WWAN is a global system for mobile (GSM), a general packet radio service (CPRS) network, a 3rd generation (3G) mobile communication network or a digital television (DTV) network; the WLAN is a wireless fidelity (Wi-Fi) network; and the WPAN is a bluetooth network, a ZigBee network or an ultra-wideband (UWB) network.

In step (b), the absolute positioning scheme includes location estimation with photogrammetry in a static state.

Figure 4:
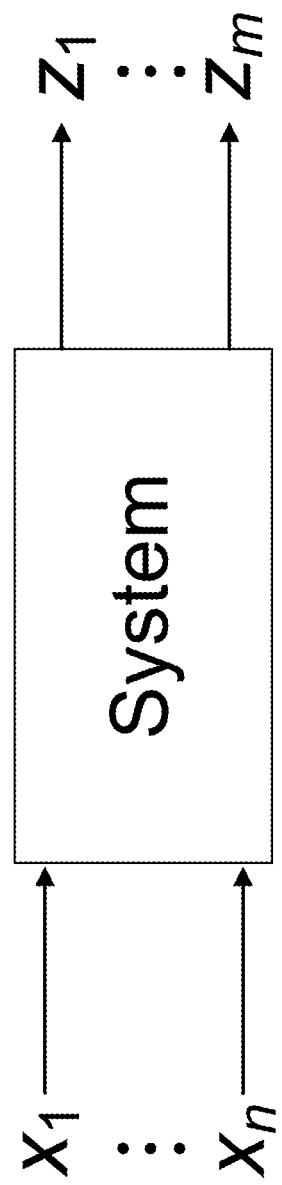
FIG. 4 is the view showing the error propagation law of the system having multiple inputs and multiple outputs.

In FIG. 4, a relationship between inputs and outputs for the error propagation law can be illustrated by matrix formulas as follow:

$$z = f(x) = Ax + b \quad (6),$$

$$\mu_z = A\mu_x + b \quad (7), \text{ and}$$

$$P_z = AP_x A^T \quad (8),$$

where $z = [z_1 \, z_2 \ldots z_m]^T$, $x = [x_1 \, x_2 \ldots x_n]$ and $b = [b_1 \, b_2 \ldots b_m]^T$; A is an m×n matrixe; $\mu_x$ and $\mu_z$ are mean matrixes; and $P_X$ and $P_z$ are covariance matrixes.

In step (c), the relative positioning scheme obtains a measured value of acceleration of the MT by using an inertial measurement unit (IMU)—which is a package of inertial sensors (electronic compasses, gyroscopes, or accelerometers).

In step (c), the relative positioning scheme includes location estimation with photogrammetry in a dynamic moving state.

In step (e), based on features of the error propagation law and inherent nature of distributed message passing in an FG scheme, the heterogeneous data fusion algorithm gives different weights to fuse values of location and speed passed between VNs and FNs according to reliability information of the values of location and speed; and, then, the messages with reliability information are efficiently passed between the time update (prediction phase) and the measurement update (correction phase) to simplify data-fusion implementation for location estimation and tracking.

Based on a Bayesian filtering approach and observation values of location and speed, a calculation formula (9) as follows is used to extract estimated values of location and speed of the MT:

$$p(s_{0:K}, x_{0:K} \mid v_{0:K}, z_{0:K}) \propto \prod_{k=1}^{K} f(s_k \mid s_{k-1}) g(x_k \mid x_{k-1}, s_{k-1}) l(v_k \mid s_k) h(z_k \mid x_k). \quad (9)$$

Figure 5:
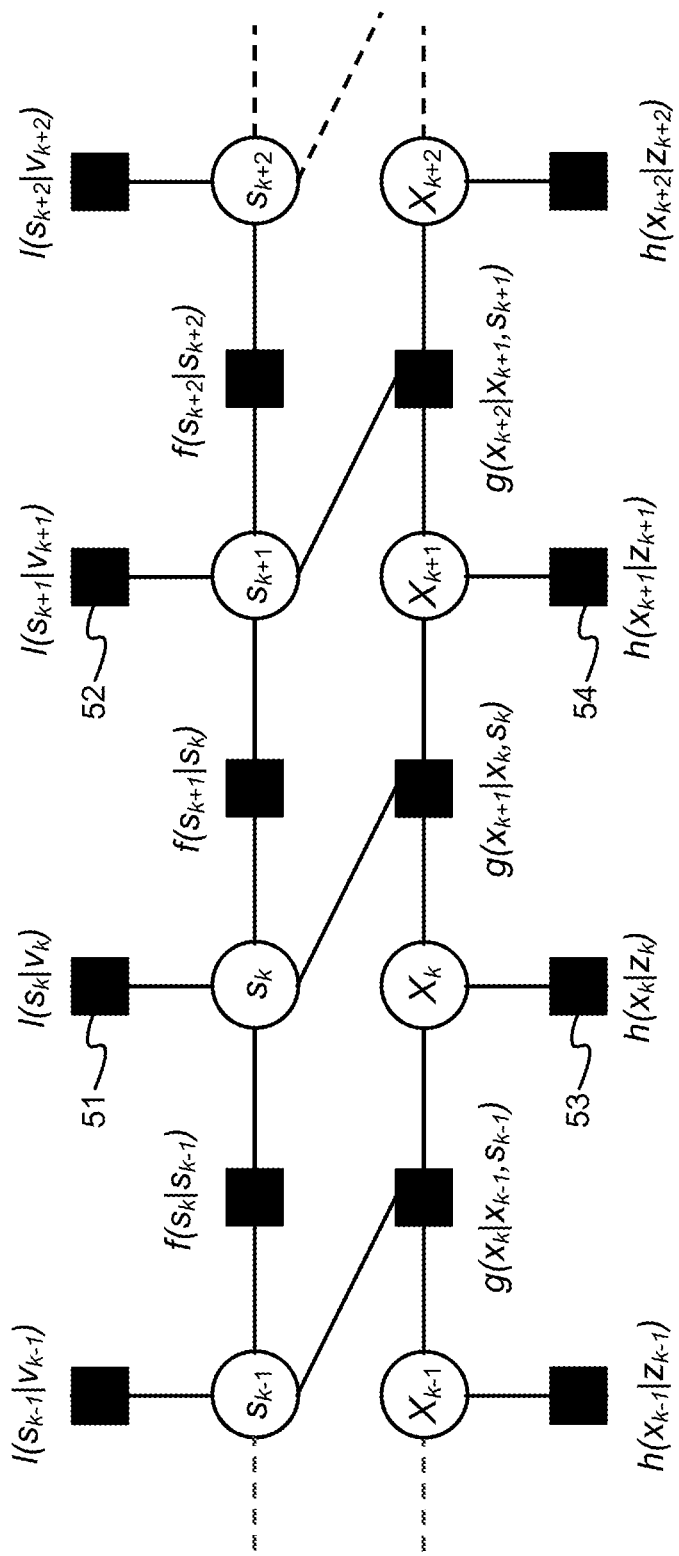
FIG. 5 is the view showing the relationships between variable nodes (VNs) and factor nodes (FNs) at the X axis in the factor graph (FG) scheme.

In FIG. 5, an FG graph is obtained through the calculation formula (9), where $I(s_k/v_k)$ 51 and $I(s_{k+1}/v_{k+1})$ 52 are observation values of speed obtained through the relative positioning scheme at the current time (time k) and the next sampling time (time k+1), respectively; and $h(x_k/z_k)$ 53 and $h(x_{k+1}/z_{k+1})$ 54 are observation values of location obtained through the absolute positioning scheme at the current time (time k) and the next sampling time (time k+1), respectively.

At right side of FIG. 6, according to features of a Gaussian distribution, a message from an FN to a VN is formed through integration of the product of two incoming messages enforced on the FN, where the integration of the product of any three Gaussian probability density functions (PDFs) has a Gaussian distribution and can be calculated with a calculation formula (10) as follows.

$$\int_{-\infty}^{\infty} \int_{-\infty}^{\infty} N(z; \alpha x + \beta y, \sigma_3^2) N(x; m_1, \sigma_1^2) N(y; m_2, \sigma_2^2) \, dx \, dy \propto N(z; \alpha m_1 + \beta m_2, \alpha^2 \sigma_1^2 + \beta^2 \sigma_2^2 + \sigma_3^2) \quad (10),$$

where N (argument; mean, variance) is a Gaussian distribution.

Figure 6:
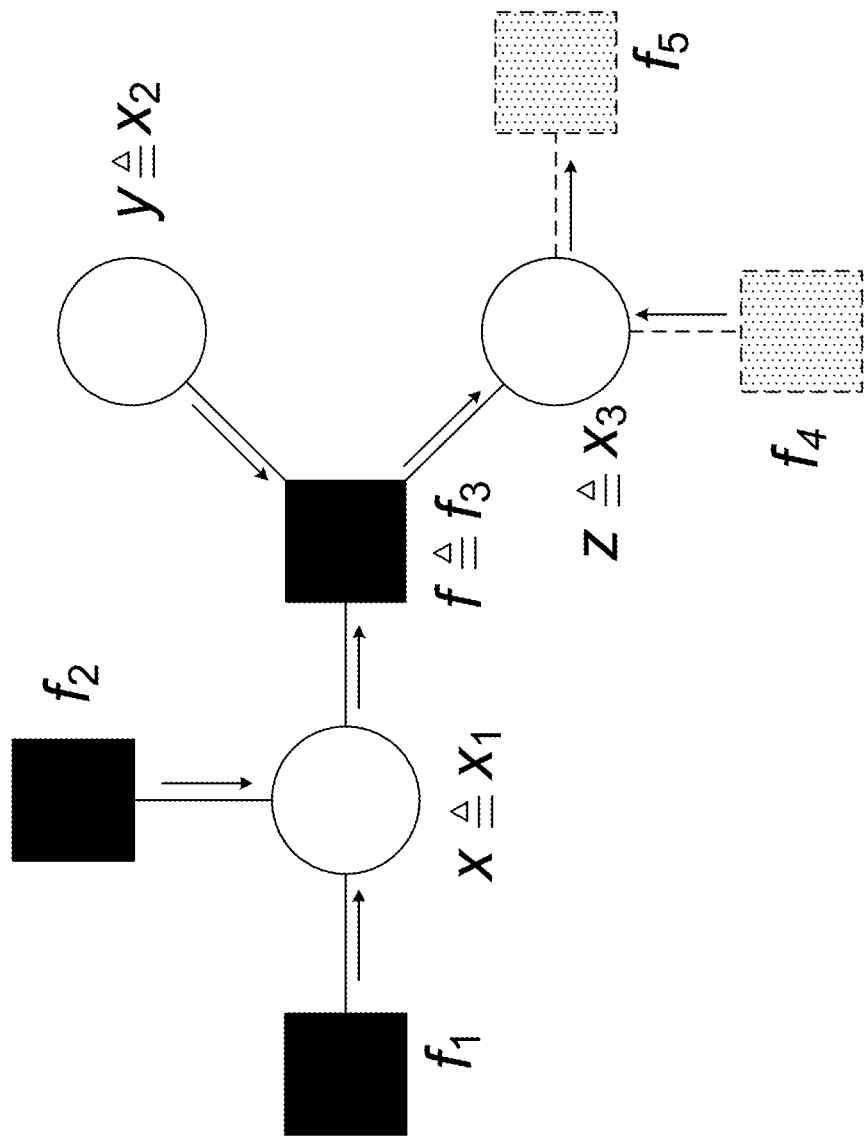
FIG. 6 is the flow view showing the heterogeneous data fusion algorithm.
Figure 7:
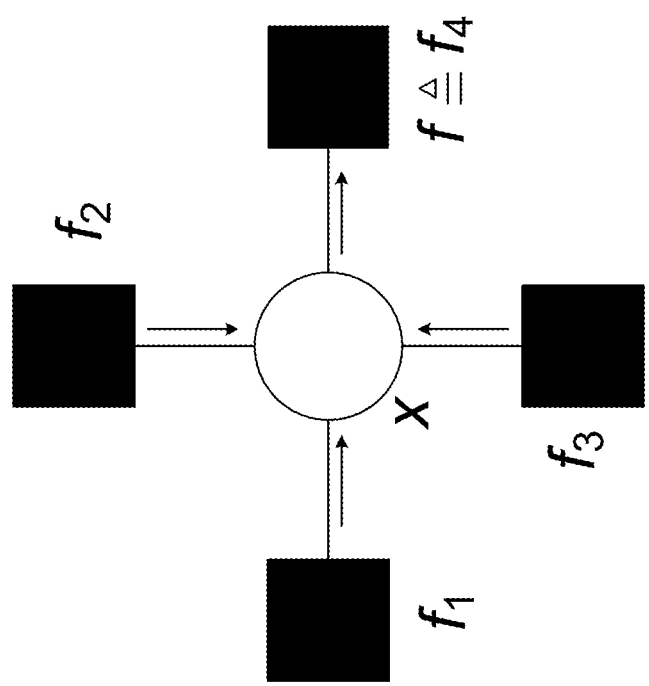
FIG. 7 is the view showing the message passing processes from the VN to the FN with the three incoming messages.

Moreover, at left side of FIG. 6, a message is passed from a VN to an FN with two incoming messages. In FIG. 7, a message is passed from a VN to an FN with three incoming messages. Thus, using the Bayesian filtering approach for location estimation and tracking, the message from the FN to the VN is taken as the prediction step; and the message from the VN to the FN is taken as the correction step.

A data flow of the heterogeneous data fusion algorithm in step (e) is shown in FIG. 3, where the message of the proposed data-fusion approach is represented by the statistical properties and is based on an FBR process.

The observation value of speed of the MT can be obtained as described in step (c). In addition, taking X axis as an example (Y axis or Z axis may use the same approach), the calculation formula (1) can be reformed to obtain a calculation formula (11) for another distribution value of speed as follows according to the distribution values of location of the MT at the current time (time k), the distribution values of location of the MT at the next sampling time (time k+1), the known sampling time, and the error propagation law:

$$s_k = \frac{x_{k+1}}{\Delta_k} - \frac{x_k}{\Delta_k} - \frac{u_{1,k}}{\Delta_k} \leftrightarrow g(s_k \mid x_{k+1}, x_k) \quad (11)$$

$$= N\left(s_k; \frac{x_{k+1} - x_k}{\Delta_k}, \frac{1}{\Delta_k^2} Q_{11,k}\right),$$

where $s_k$ is an estimated value of speed of the MT, and $$\frac{u_{1,k}}{\Delta_k}$$

is a speed random error of the MT.

Figure 2:
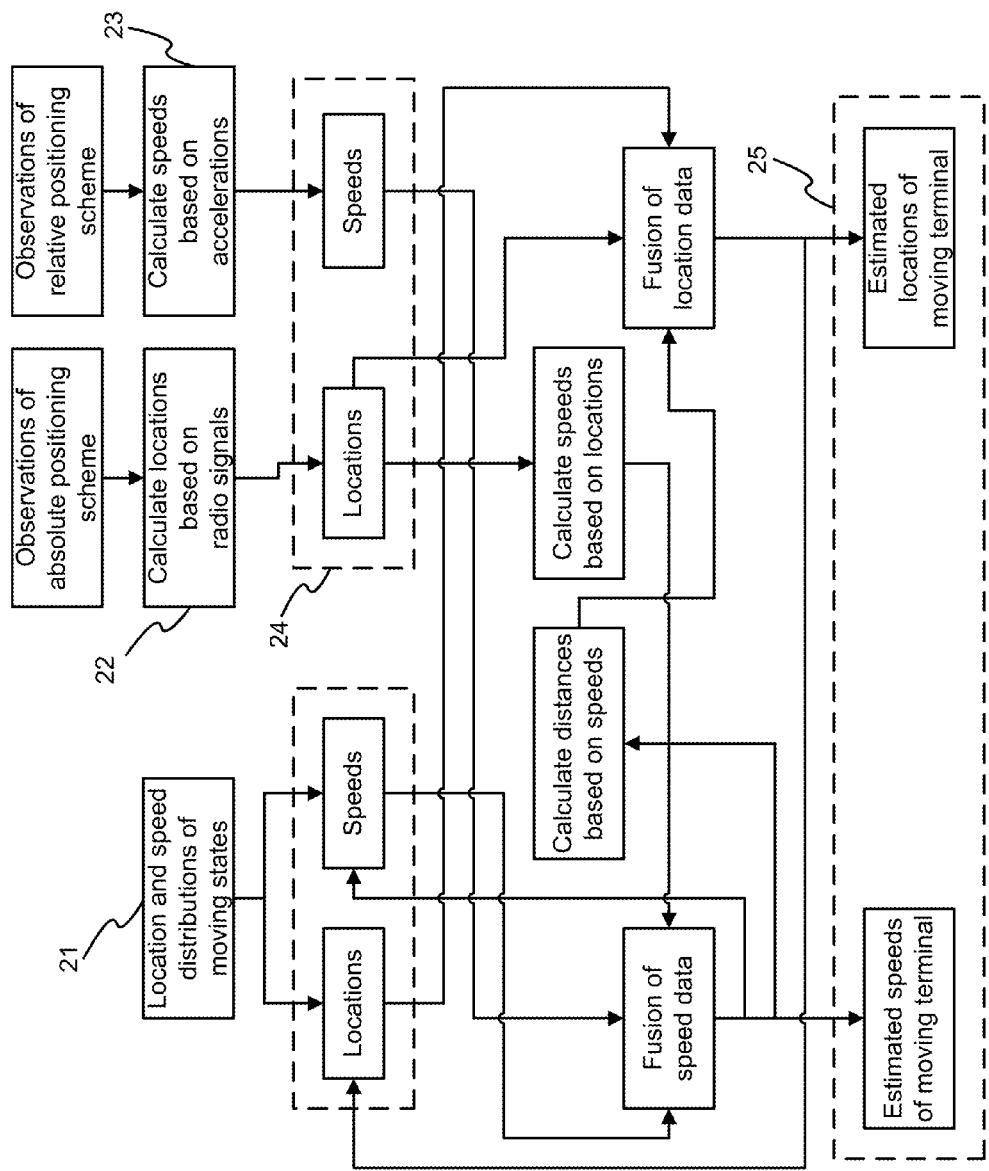
FIG. 2 is the block view showing the flow of the message passing.

In the present invention, an estimated location of the MT using the absolute positioning scheme can be extracted from the observation value of the radio signal; an estimated speed of the MT using the relative positioning scheme can be extracted from the error propagation law and the observation value of acceleration with an IMU. As shown in FIG. 1 to FIG. 3, the present invention has location estimation and tracking techniques with good location accuracy and low computational complexity for fusing radio ranging observation with speed sensing observation; and, then, a location estimation of the MT based on the absolute and relative approaches is obtained by heterogeneous observations. To effectively simplify the implementation, the message of the proposed data-fusion tracking approach can be represented by the statistical properties of the estimated variables, and the errors are expressed in the form of a Gaussian probability density function. On using the present invention, as the multiple observation data has Gaussian distribution, the data obtained through the absolute positioning scheme and the relative positioning scheme use an FBR low-complexity heterogeneous data-fusion algorithm to give different weights for fusion for extracting values of location and speed by using a heterogeneous data-fusion algorithm according to the reliability information of location and speed to correct the estimated values of location and speed of the MT.

Figure 8:
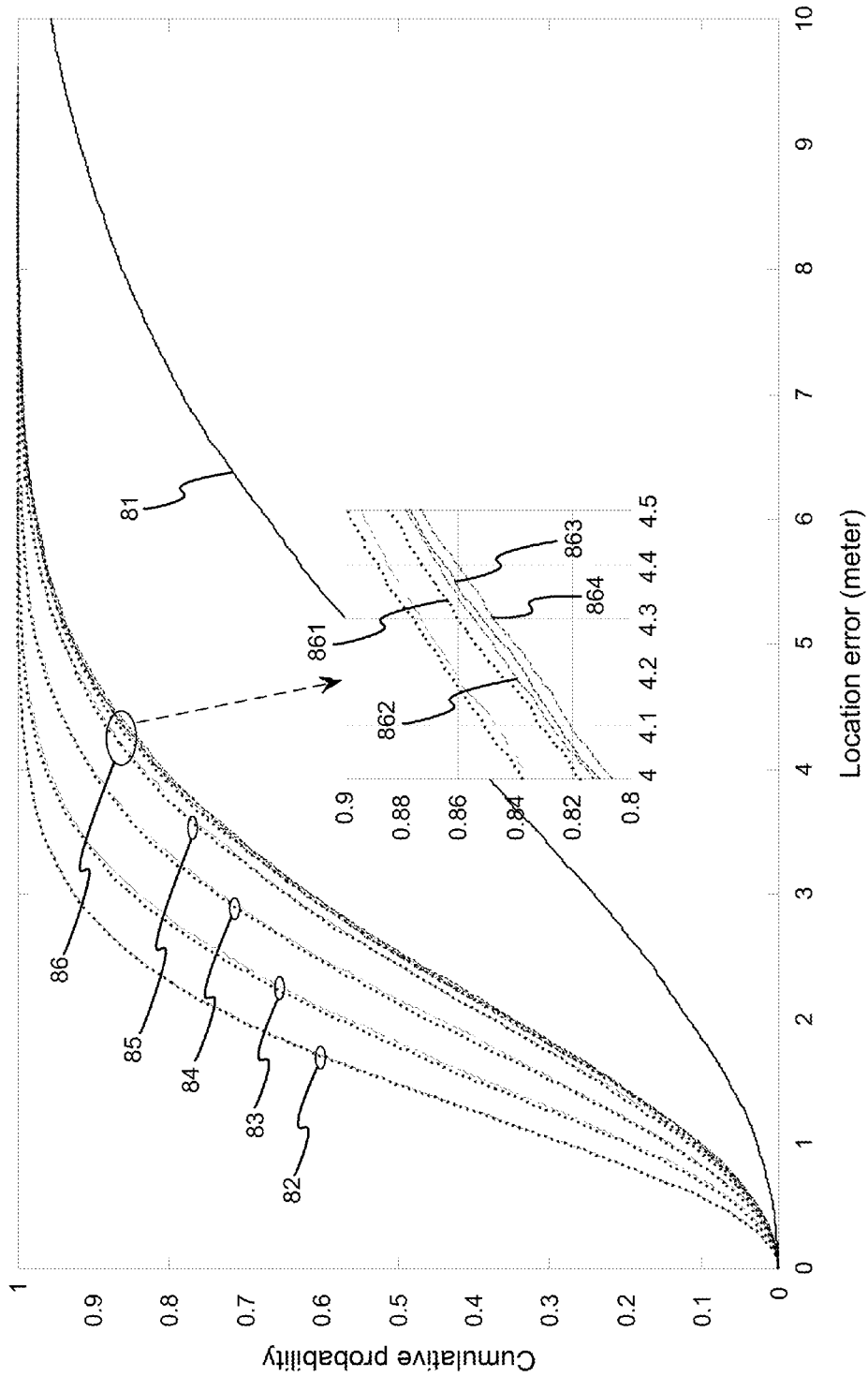
FIG. 8 is the view showing the comparison among different location estimation and tracking schemes in terms of the cumulative distribution function (CDF) of the error distances for different speed variances.
Figure 9:
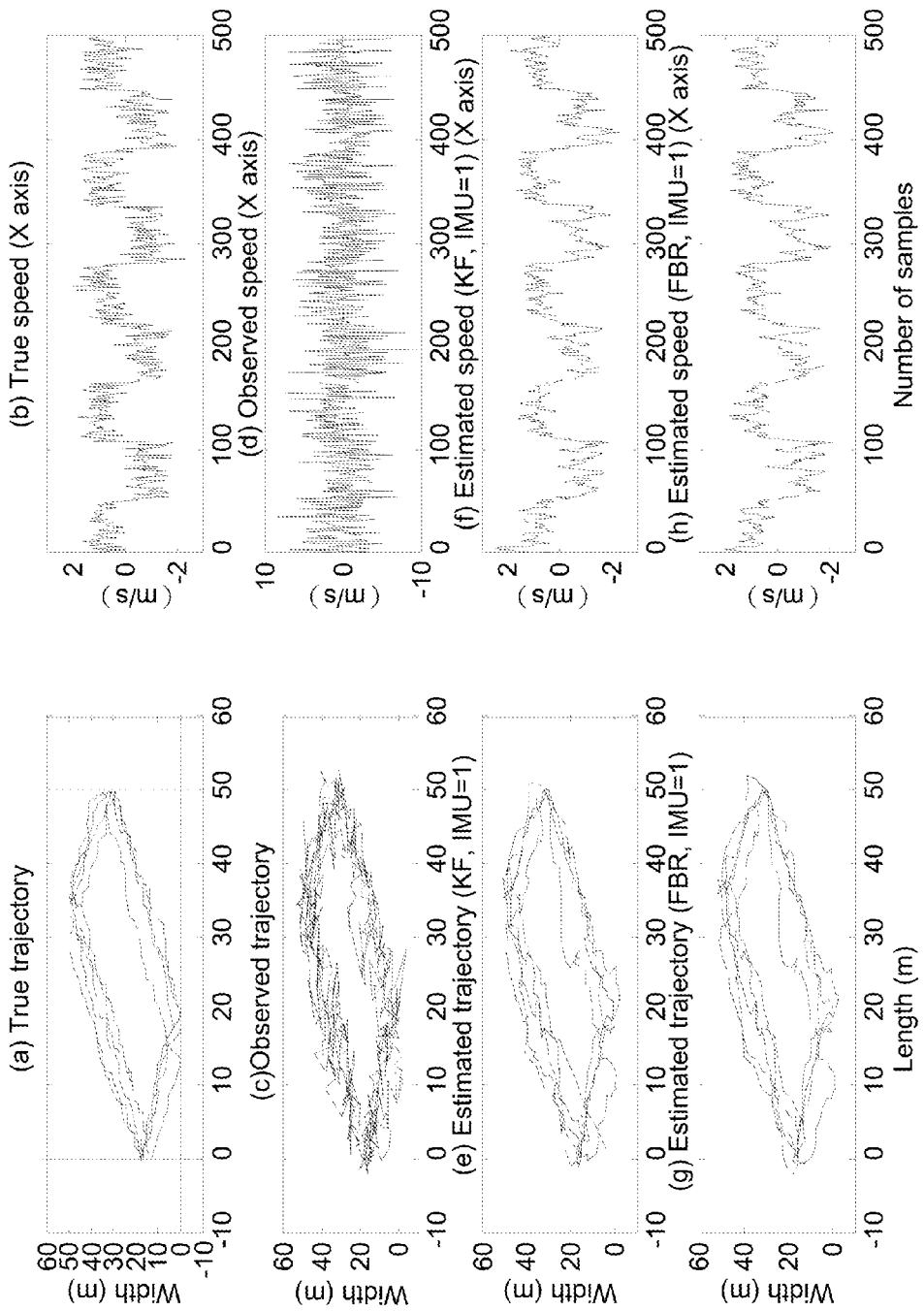
FIG. 9 is the view showing the comparison of the estimated results of the moving trajectory and speed of the MT obtained by using the KF-based data-fusion scheme and the FBR-based data-fusion scheme.

Please refer to FIG. 8 to FIG. 10, which are a view showing comparison among different location estimation and tracking schemes in terms of the CDF of the error distances for different speed variances; a view showing comparison of estimated results of moving trajectory and speed of an MT obtained by using a KF-based data-fusion scheme and an FBR-based data-fusion scheme; and a view showing comparison of 2D computational complexities between a KF-based data-fusion scheme and an FBR-based data-fusion scheme. As shown in the figures, results using an FBR data fusion algorithm are compared with results of a traditional KF data fusion algorithm (a mean-square error (MSE) algorithm), including a comparison of accumulative errors in location estimation; a comparison of estimated results of moving trajectory and speed; and a comparison of computational complexity of 2D model, respectively. Regarding simulation parameters used in FIG. 8, the variation of observation of location information has standard deviations of $\sigma_\epsilon=4$ to accommodate the radio ranging errors for the absolute positioning scheme in an indoor environment; and the variation of prediction has standard deviations of $\sigma_u=0.4$ to accommodate the moving state. In FIG. 8, a first curve 81 represents a result of positioning without fusion and tracking; with standard deviations of accelerations setting to 0.1 s/m², first comparative curves 82 comprise a solid curve representing FBR IMU and a dashed curve representing KF IMU; with standard deviations of accelerations setting to 0.5 s/m², second comparative curves 83 comprise a solid curve representing FBR IMU and a dashed curve representing KF IMU; with standard deviations of accelerations setting to 1 s/m², third comparative curves 84 comprise a solid curve representing FBR IMU and a dashed curve representing KF IMU; with standard deviations of accelerations setting to 2 s/m², fourth comparative curves 85 comprise a solid curve representing FBR IMU and a dashed curve representing KF IMU; fifth comparative curves 86 comprise a second curve 861, a third curve 862, a fourth curve 863 and a fifth curve 864; with standard deviations of accelerations setting to 3 s/m², the second curve 861 represents FBR IMU, the third curve 862 represents KF IMU; and with standard deviations of accelerations setting to 4 s/m², the fourth curve 863 represents FBR IMU and the fifth curve 864 represents KF IMU.

The location estimation techniques used in the present invention not only fuse the observation data of multiple location-estimation approaches but also provide a low-complexity distributed heterogeneous data-fusion algorithm, where the result of the data-fusion tracking approaches using message passing is based on the FBR scheme to combine radio ranging with speed sensing measurements (FBR-based) for location estimation and tracking.

The present invention reveals a method of location estimation and tracking based on distributed message passing for reducing computational complexity of heterogeneous data fusion. The present invention is based on a Bayesian filtering approach to obtain capacities of predicting (time update) and correcting (measurement update) for a distributed FG method. Thus, different weights are given to passed data having Gaussian distribution between VNs and FNs according to reliability information of location and speed to correct the estimated values of location and speed of the MT. In addition, the recursive Bayesian filtering approach, the inherent nature of distributed message passing of the FG method, and the features of the error propagation law are combined to form a low-complexity heterogeneous data fusion algorithm to reduce computational complexity of the traditional KF methods for location estimation and tracking.

As shown in FIG. 8 to FIG. 10, the present invention illustrates that the FBR scheme passing the reliable messages between the VNs and the FNs is better than the non-data-fusion tracking schemes and can achieve an accurate location very close to the KF data-fusion tracking scheme. In addition, the computational load of the proposed scheme is much smaller than that of traditional KF data-fusion tracking schemes for easy implementation.

To sum up, the present invention is a method of location estimation and tracking using distributed message passing of heterogeneous observation data accompanied with a low-complexity data-fusion scheme, where Gaussian-distributed observations of location and speed obtained through an absolute positioning scheme and a relative positioning scheme are combined for fusion of passed messages; the present invention uses inherent features of distributed message passing for effectively reducing computational complexity of location estimation and tracking on processing location and speed information during heterogeneous data fusion; and, by reducing the computational complexities of conventional data-fusion algorithms for location tracking in heterogeneous measurements, calculation efficiency is improved and power efficient features have been implemented.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of location estimation using distributed message passing of heterogeneous observation data accompanied with a data-fusion scheme, the method comprising:

obtaining values of location ($x_{1,k}$, $x_{2,k}$) of a moving terminal (MT) from observed values of currently received radio signals transmitted from base stations of a digital television system, a wireless local area network (WLAN), or a wireless personal area network (WPAN) which are land-based signals at a current time (time k); and obtaining values of speed ($s_{1,k}$, $s_{2,k}$) of a moving terminal (MT) from observed values of the acceleration and an error propagation law at a current time (time k), and where predicting values of location and speed of said MT at a next sampling time (time k+1) using a calculation formula $$\begin{bmatrix} \tilde{x} \\ \tilde{s} \end{bmatrix} = \begin{bmatrix} x_{1,k+1} \\ x_{2,k+1} \\ \dot{x}_{1,k+1} \\ \dot{x}_{2,k+1} \end{bmatrix} = \begin{bmatrix} x_{1,k+1} \\ x_{2,k+1} \\ s_{1,k+1} \\ s_{2,k+1} \end{bmatrix} = \begin{bmatrix} 1 & 0 & \Delta_k & 0 \\ 0 & 1 & 0 & \Delta_k \\ 0 & 0 & 1 & 0 \\ 0 & 0 & 0 & 1 \end{bmatrix} \begin{bmatrix} x_{1,k} \\ x_{2,k} \\ \dot{x}_{1,k} \\ \dot{x}_{2,k} \end{bmatrix} + \begin{bmatrix} u_{1,k} \\ u_{2,k} \\ u_{3,k} \\ u_{4,k} \end{bmatrix}$$

to obtain the predicted values of location and speed of said MT at said next sampling time (time k+1) are ($x_{1,k+1}$,$x_{2,k+1}$) and ($\dot{x}_{1,k+1}$,$\dot{x}_{2,k+1}$)=($s_{1,k+1}$,$s_{2,k+1}$)), respectively; and where ($u_{1,k}$, $u_{2,k}$) and ($u_{3,k}$, $u_{4,k}$) are predicted errors of location and speed of said MT at said current time, respectively; and $\Delta_k$ is selected from a group consisting of a sampling time and a time-difference between said current time and said next sampling time when said MT moves to a location at said next sampling time (time k+1), combing said observed values of location at time k with said obtained values of speed at time k to obtain the predicted values in the form of means and variances at said next sampling time (time k+1); and obtaining the observed values in the form of means and variances of location and speed of said MT at said next sampling time (time k+1), receptively, and, then, based on the predicted values in the form of means and variances of location and speed and the observed values in the form of means and variances of location and speed, giving different fusion weights to extract more accurate estimated values in the form of means and variances of location and speed by using a heterogeneous data fusion algorithm at said next sampling time (time k+1); and based on features of said error propagation law and an inherent nature of distributed message passing in a factor graph (FG) scheme, said heterogeneous data fusion algorithm gives different weights to fuse values of location and speed passed between variable nodes (VNs) and factor nodes (FNs) according to reliability information between said values of location and speed.

2. The method according to claim 1, wherein the currently received land-based signal is from a WLAN which is a wireless fidelity (Wi-Fi) network.

3. The method according to claim 1, wherein the currently received land-based signal is from a WPAN which is a network selected from a group consisting of a bluetooth network, a ZigBee network, and an ultra-wideband (UWB) network.

4. The method according to claim 1, wherein the value of acceleration of said MT is observed by using an inertial measurement unit (IMU) and said IMU is a package of inertial sensors selected from a group consisting of electronic compasses, gyroscopes and accelerometers.

5. The method according to claim 1, wherein said method is used in an environment of a coordinate system having more than two dimensions.

* * * * *